(12) United States Patent
Yi et al.

(10) Patent No.: US 6,498,787 B1
(45) Date of Patent: Dec. 24, 2002

(54) METHOD AND APPARATUS FOR SENDING AND RECEIVING SERVICE UTILIZATION MESSAGES

(75) Inventors: Steppen Aman Yi, Lisle, IL (US);
Daniel J. McDonald, Cary, IL (US);
Larry Michael Peterson, West Dundee, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/223,351

(22) Filed: Dec. 30, 1998

(51) Int. Cl.[7] ............................................. H04L 12/56
(52) U.S. Cl. ........................................ 370/328; 370/389
(58) Field of Search .................................. 370/389, 474, 370/328, 394

(56) References Cited

U.S. PATENT DOCUMENTS 4,897,841 A * 1/1990 Gang, Jr.
5,563,889 A * 10/1996 Gard et al.
5,926,478 A * 7/1999 Ghaibeh et al.

* cited by examiner

*Primary Examiner*—Ken Vandepuye
(74) *Attorney, Agent, or Firm*—Susan L. Lukasik; Frank M. Scutch, III.; Steven R. Santema

(57) ABSTRACT

A method of sending (321) a service utilization message in a communication system (100) includes the steps of forming (303 through 317) a service utilization message and sending (321) the service utilization message via a service port (109). The service utilization message includes a header, a service controller packet, and a service manager packet. The header includes a block source field (201), a block destination field (203), a block length field (205), and a block command type field (207). The service controller packet includes a block opcode field (209) and a controller packet (211). The service manager packet includes a manager packet (213) and a block sequence number field (215). The service utilization messages assist with call billing and call logging for communication systems (100). A service utilization linking message is similarly formed (503 through 517) and sent (521).

30 Claims, 4 Drawing Sheets

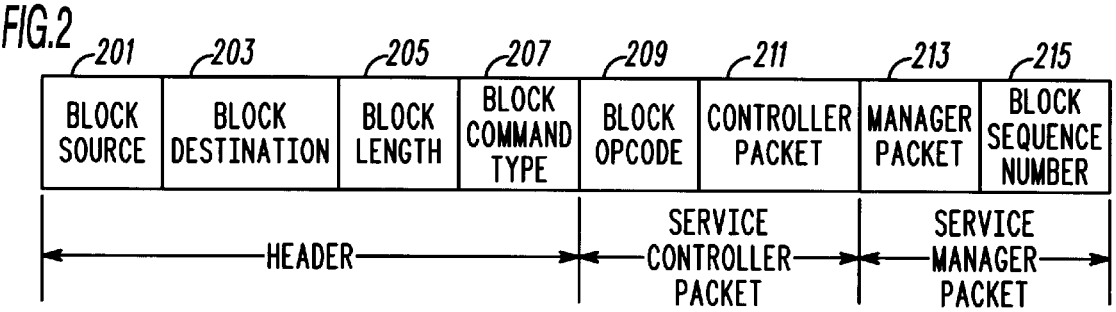
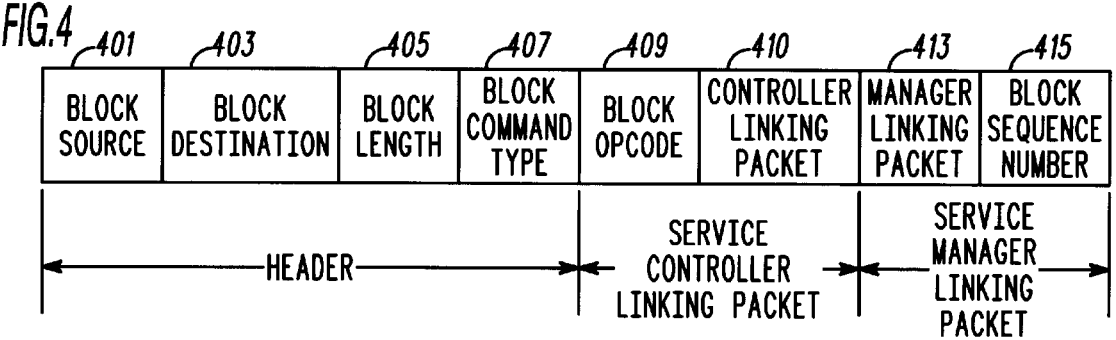

METHOD AND APPARATUS FOR SENDING AND RECEIVING SERVICE UTILIZATION MESSAGES

FIELD OF THE INVENTION

This invention relates to communications systems, including but not limited to tracking call information for radio frequency (RF) communication systems.

BACKGROUND OF THE INVENTION

The basic operation and structure of a land mobile radio system is well known. Land mobile radio systems typically comprise one or more radio communication units and one or more repeaters that transceive information via the RF communication resources. These communication resources may be narrow band frequency modulated channels, time division multiplex slots, frequency pairs, and so forth. Land mobile radio systems may be organized as trunked communication systems, where a plurality of communication resources is allocated amongst a group of users by assigning the repeaters on a communication-by-communication basis with an RF coverage area.

Land mobile radio systems are useful for providing communications for many different types of users, including police agencies, fire departments, businesses with dispatch requirements such as ambulances and taxis, utilities, armed forces, trucking, and so forth. Often times, the system operators desire various methods of tracking the numerous phone calls placed on their systems throughout the day. Desired methods include billing and logging or recording of calls taking place on each system.

Accordingly, there is a need for providing call information to assist in tracking calls in a communication system.

BRIEF DESCRIPTION OF THE DRAWINGS

FIG. 2 is a bit field representation of a service utilization message in accordance with the invention.

FIG. 4 is a bit field representation of a service utilization linking message in accordance with the invention.

DESCRIPTION OF A PREFERRED EMBODIMENT

The following describes an apparatus for and method of sending messages in a communication system such that tracking methods, such as call billing and call logging, are provided relevant information in an efficient manner. For such various call tracking methods, particular call information that is tracked includes call time, duration, talkgroup, individual identification (ID), call type, system resources utilized, and other desirable information that assists with the tracking methods.

Figure 1:
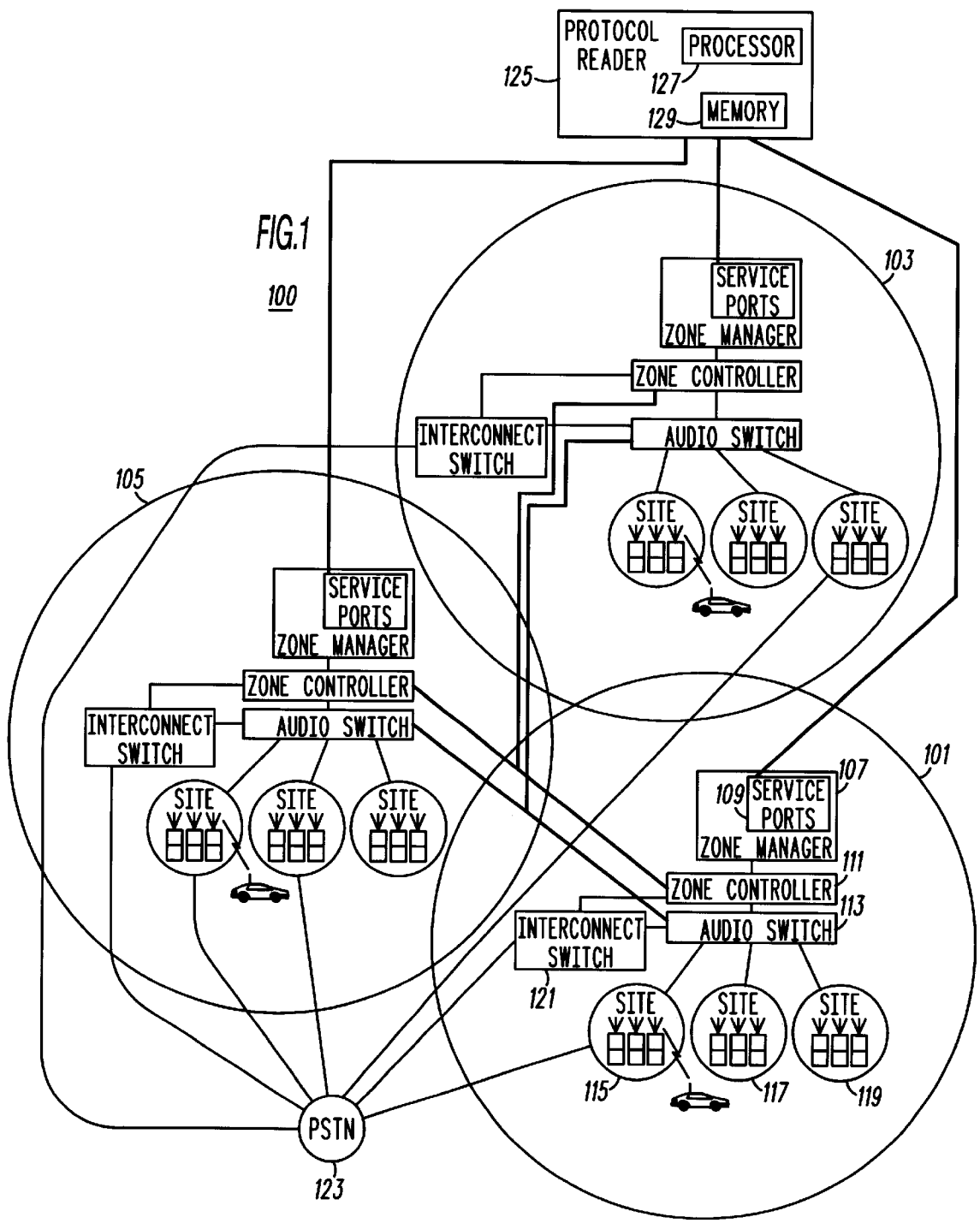
FIG. 1 is a block diagram of a communication system that generates service utilization messages and service utilization linking messages in accordance with the invention.

A block diagram of a communications system that generates service utilization messages and service utilization linking messages is shown in the FIG. 1. The communication system 100 may be a multiple zone communication system, such as a SmartZone™ OmniLink™ communication system, available from Motorola, Inc. The present invention may be also be applied to a single-site system, such as a SmartNet™ system, or a multiple-site system, such as a SmartZone™ system, both available from Motorola, Inc. Three zones 101, 103, and 105 are shown for the sake of simplicity, although the present invention may be successfully implemented in systems having one or more zones. Each zone 101, 103, and 105 contains a zone manager 107, a zone controller 111, an audio switch 113, a plurality of sites 115, 117, and 119, an interconnect switch 121, and any other infrastructure or devices as necessary to provide radio frequency and radio frequency to land line communications. Communication consoles (not shown) may also be part of such a system.

The zone manager 107, such as a Zone Manager™ network manager available from Motorola, Inc., generally provides fault configuration, performance, accounting, and security management for the system equipment and communication units for the zone 101 in which the zone manager 107 resides. The zone controller 111, such as a Zone Controller™ call controller available from Motorola, Inc., generally provides overall call control, including communication resource management for sites within the zone 101 in which the zone controller 111 resides. The zone controller 111 may additionally provide interzone call control when the zone controller 111 performs as a controlling zone controller, as described below. The zone controllers 111 for each zone in the system are interconnected in order to more quickly provide control for multiple zone calls. A zone controller 111 may be a participating zone (PZ) controller or a controlling zone (CZ) controller, which is determined on a call-by-call basis. The zone controller (ZC) 111 will be a controlling zone when this particular zone is the controlling element for a multiple zone call. Which zone controller 111 is considered a controlling zone controller for a particular call may be defined in a number of ways, including by a predetermined controller-to-talkgroup mapping, whereby each zone is the controlling zone for handling calls for a predetermined subset of the total number of talkgroups in the communication system 100. Any zone controller 111 that is not the controlling zone controller but is providing resources or otherwise participating in a call is a participating zone controller.

An audio switch 113, such as an Ambassador Electronics Bank available from Motorola, Inc., sources audio to the different sites at each communication system. The audio switch 113 for each of the zones is interconnected so that multiple zones communication invisibly to the users of the multiple zone system. Each zone 101, 103, and 105 is comprised of a plurality of sites 115, 117, 119 at which one or more repeaters or base stations are present, which repeaters provide direct communications to communication units within the coverage area of the communication system 100. Although three sites 115, 117, and 119 are shown in the drawing, the present invention may be successfully implemented with one or more sites within a zone. An interconnect switch 121, such as a Motorola Business eXchange available from Motorola, Inc., is connected to the zone controller 111 and audio switch 113 as well as the public switched telephone network (PSTN) 123, in order to provide telephone interconnect capability for the users of the communication system 100. The interconnect switch 121, as well as the audio switch 113 present at each zone allows a telephone interconnect call to be made across multiple zones via a communication unit, such as a two-way mobile or portable radio.

The present invention provides a method and apparatus for sending messages in the communication system such that tracking methods such as call billing and call logging provide relevant information in an efficient manner. This information will be provided by the zone manager 107 through its service port(s) 109 to a protocol reader 125. The service port(s) 109 is one or more access point for applications to obtain system information, including service utilization messages and service utilization linking messages, by devices inside and/or outside the system 100. The protocol reader is a device external or internal to the communication system 100, which device receives and processes service utilization messages and service utilization linking messages and any other types of messages that may be provided to it for use by the protocol reader 125 for functions such as call billing, call logging, emergency alarm display, statistical reporting, trend analysis, optimization, troubleshooting, call event reconstruction, and so forth. The protocol reader 125 may include a processor 127 and associated memory 129, such as a personal computer (PC) or workstation.

The present method provides information in the form of service utilization messages that provide intrazone communication information to and from participating zones and service utilization linking messages that provide interzone communication information to and from a controlling zone. Both types of messages share a common structure, including (a) a header, which has the same field structure for both types of messages; (b) a service controller structure; and (c) a service manager structure. In the preferred embodiment, information is assembled in octets, or 8-bit groupings. All field sizes are given in terms of octets as utilized in the preferred embodiment, although other field lengths may also be successfully utilized as long the receiving device is made award of the field length. The similarities and differences between these message types are shown in FIG. 2 and FIG. 4 and described in the associated text.

A bit field representation of a service utilization message is shown in FIG. 2. The header comprises a Block Source Field 201, a Block Destination Field 203, a Block Length Field 205, and a Block Command Type Field 207. The Block Source Field 201 is one octet in length and contains a code that refers to the logical device that sourced the request. In the preferred embodiment, the Block Source Field 201 uses the following value assignments:

| VALUE | LOGICAL DEVICE |
|-------|----------------|
| 0 | No address |
| 1 | Controller |
| 2 | Radio control manager |
| 5 | Console |
| 0x8n | Computer aided dispatch (CAD) | where 0x80 is the most significant bit of an octet that is a bitmask that identifies the CAD command; n is the CAD host number sequentially assigned number from 1. The Block Destination Field 203 is one octet in length and contains a code that refers to the logical device where the packet is to be sent. In the preferred embodiment, the value 0 is used for no address and the value 0x8n is used for CAD, as described with respect to the Block Source Field 201. The Block Length Field 205 is two octets in length and contains the length of the entire message, either a service utilization message or a service utilization linking message, in terms of octets in the preferred embodiment. The Block Command Type Field 209 is two octets in length and contains a code that refers to the type being sent. The following block command types represents a category of events for which a detailed description is provided below:

| VALUE | COMMAND TYPE |
|-------|--------------|
| 1 | Radio command |
| 6 | Call activity update |
| 7 | End of call |
| 8 | Radio status traffic |
| 14 | Controlling zone update |
| 15 | Resource removed update |
| 31 | Interconnect call information |
| 32 | Link status update |

Other values may be used to represent other command types, not shown or described here.

The service utilization message also contains a service controller packet, which comprises a Block Opcode Field 209 and a Controller Packet 211. The Block Opcode Field 209 is two octets in length and indicates what function is being performed by the service utilization message and/or what subsequent data may be sent and how it should be interpreted. The Block Opcode Field 209 also indicates what the subsequent data is and how it should be interpreted. The Block Opcode Field 209 varies depending on the Block Command Type 207 for the message. Various Block Opcode Fields 209 are described below with respect to particular command types. Some fields may not contain valid information for all Block Opcode Fields 209 in the preferred embodiment. The Controller Packet 211 varies in length and generally provides information related to intrazone communications associated with a particular zone 101. Various Controller Packets 211 are described below with respect to particular command types.

The service utilization message also contains a service manager packet, which comprises a Manager Packet 213 and a Block Sequence Number Field 215. The Manager Packet 213 varies in length and generally provides subscriber names, e.g., individual and talkgroup names, and agency IDs. The Manager Packet 213 provides a mechanism for call tracking using user names and/or agency rather than IDs. Various Manager Packets 213 are described below with respect to particular command types. The Block Sequence Number 215 is four octets in length. A wrapping counter specifies the Block Sequence Number 215 of the message. In the preferred embodiment, this field is an unsigned field and the first packet after system start-up is given sequence number 1, then it counts up to a maximum value for a 4-octet number, after which the number rolls back to 1.

Figure 3:
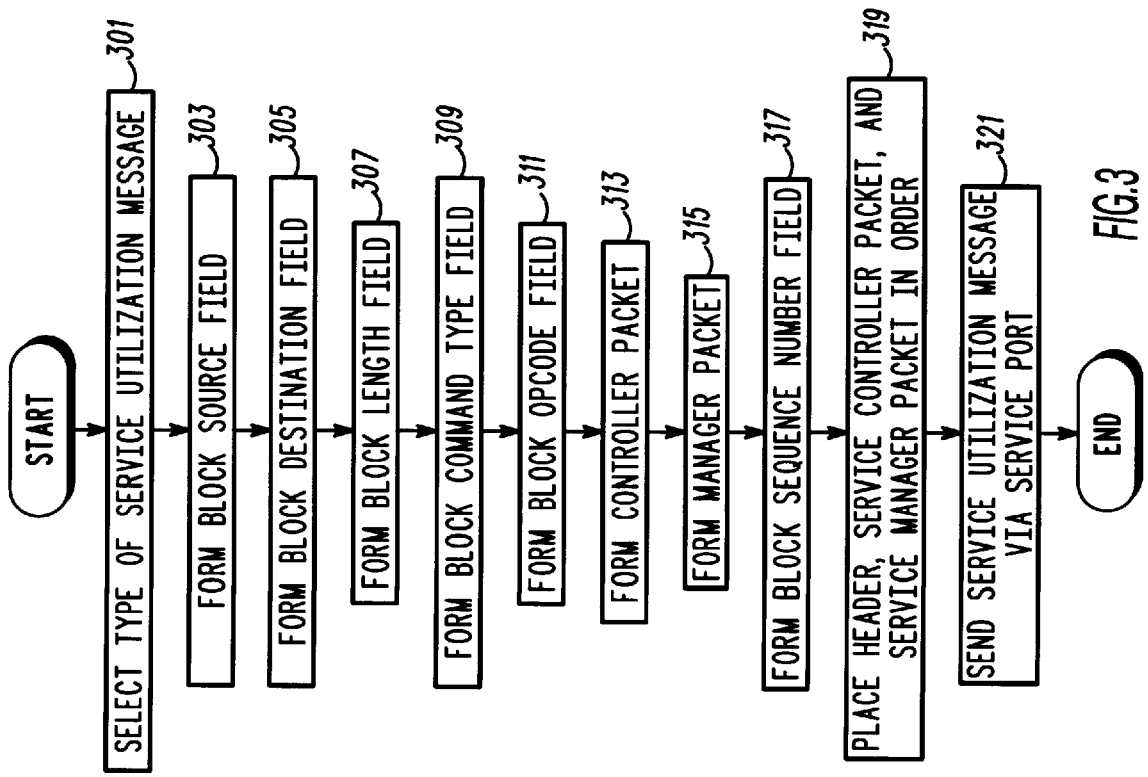
FIG. 3 is a flowchart showing a method of forming a service utilization message in accordance with the invention.

A method of sending a service utilization message in a communication system is shown in the flowchart of FIG. 3. At step 301, the type of service utilization message is selected. Various types of service utilization messages are described below. The header is created by forming the Block Source Field 201 at step 303, the Block Destination Field 203 at step 305, the Block Length Field 205 at step 307, and a Block Command Type Field 207 at step 309, which fields are described with respect to FIG. 2 above. The service controller packet is created by forming the Block Opcode Field 209 at step 311, as described with respect to FIG. 2 above, and at step 313 the Controller Packet 211 by selecting the Controller Packet 211 that is utilized for the type of service utilization message selected at step 301. The service manager packet is created by forming, at step 315, the Manager Packet 213 that is utilized for the type of service utilization message selected at step 301, and forming at step 317 the Block Sequence Number Field 215, as described with respect to FIG. 2 above. At step 319, the header, service controller packet, service manager packet, and fields therein are placed in the order as shown in FIG. 2, thereby forming a completed service utilization message. At step 321, the completed service utilization message is then sent via the service port 109.

Various types of service utilization messages include Call Activity Update Messages, End of Call Messages, Radio Status Traffic Messages, Interconnect Call Information Messages, System Activity Event Messages, and Radio Command Messages. These messages are described in detail as follows. The fields and field lengths are described below in the exact order and length as they are utilized in the preferred embodiment. One of skill in the art would be able to modify the field lengths and ordering to obtain a successful protocol, however, the protocol reader 125 (receiving device) must know the field lengths and field order to be able to successfully receive and decode the information.

A Call Activity Message contains information on communication unit, such as mobile and portable 2-way radios, and console activity that is related to call activity. Messages include start of call and various changes to the call. Calls are identified by a Universal Call Number so that all packets pertaining to a single call can be traced. After an End of Call Message (described below) is sent for a particular call number, the call number may be reused to identify a new call. In the preferred embodiment, the Block Opcode 209 information for a Call Activity Message is as follows.

| VALUE | BLOCK OPCODE DESCRIPTION |
|---|---|
| 1 | Indicates that a new call has started. |
| 2 | Indicates that the specified individual (see Primary ID field) has initiated a PTT (push-to-talk) and is actively sourcing the call. |
| 3 | Indicates that the specified individual has initiated a PTT on an active call, but does not control the call. This can occur, for example, when a console operator is talking at the same time as the individual. |
| 4 | Indicates that the specified individual initiated a PTT on a busy call. The individual is now considered the busy requester. |
| 5 | Indicates that the specified individual initiated a PTT on a busy call, but is not considered the requester. This may occur when another individual with higher priority was also busied. |
| 6 | Indicates that call related information has changed, including sites that have been added or removed from a call. |
| 7 | A busied call has been converted from global busy to active (or to active and busy). |
| 8 | Indicates a change in the call's state has occurred. |

The format and data associated with the Controller Packet 211 for the Call Activity Message are as follows.

A Primary ID (identification) field (4 octets) contains a trunking individual ID of the radio sourcing the audio for the present call. A Requester Affiliation Type field (1 octet) contains the type of the trunking group to which the requester is currently affiliated. In the preferred embodiment, the affiliation type values are defined as:

| VALUE | AFFILIATION TYPE |
|---|---|
| 0 | Default value/Default value |
| 1 | Talkgroup Affiliation |
| 2 | Multi-Group Affiliation |
| 3 | Deaffiliated |
| 3 | Deregistered |
| 4 | Affiliation timed out due to lack of activity |
| 4 | Registration timed out due to lack of activity |
| 5 | Unknown Affiliation |
| 6 | Invalid Affiliation |
| 7 | Invalid Requester ID for affiliation |
| 8 | Unit is registered but not affiliated |

A Requester Affiliated Group ID field (4 octets) contains the affiliated trunking group ID of the requesting individual. A Requester Affiliated Zone ID field (1 octet) contains the ID of the zone at which the individual is currently located. A Requester Affiliated Site ID field (1 octet) contains the ID of the site at which the individual is currently located. A Requester Protocol Type field (1 octet) contains the protocol type of the requester. In the preferred embodiment, the protocol types and values are defined as:

| VALUE | PROTOCOL TYPE |
|---|---|
| 0 | Default value |
| 1 | Trunking type 1 |
| 2 | Trunking type 2 |
| 3 | Data |
| 4 | Motorola Propriety digital 1 |
| 5 | Motorola Propriety digital 2 |
| 6 | Standard digital |

A Requester Device Type field (1 octet) contains the type of device the requester ID is associated with. In the preferred embodiment, device type values include:

| VALUE | DEVICE TYPE |
|---|---|
| 0 | Default value |
| 1 | Console request |
| 2 | Radio request |
| 3 | Centralized landline request |
| 4 | Decentralized landline request |
| 5 | Zone Controller request |

A Radio Type Qualifiers field (4 octets) contains flags that indicate the type of event that has been received from the Zone Controller. These flags may be combined to allow for a multitude of event types to be generated. In the preferred embodiment, radio type qualifiers values include:

| VALUE | RADIO TYPE QUALIFIER |
|---|---|
| 0x00000000 | Empty event qualifier |
| 0x80000000 | Emergency call/event |
| 0x40000000 | Multi-group call/event |
| 0x20000000 | Patch regroup call/event |
| 0x10000000 | Multi-select call/event |
| 0x08000000 | Interconnect call/event |
| 0x04000000 | Coded call/event |
| 0x02000000 | Landline initiated call |
| 0x01000000 | Audio patch call |
| 0x00800000 | Interconnect ring state |

-continued

| VALUE | RADIO TYPE QUALIFIER |
|---|---|
| 0x00400000 | Interconnect transpond state |
| 0x00200000 | Site-wide call |
| 0x00100000 | Motorola Proprietary digital call |
| 0x00080000 | Site only call |
| 0x00040000 | Repeat disabled call/event |
| 0x00010000 | Grid operator call |

A Secondary ID field (4 octets) contains additional ID information for the call activity packet. The content of this field is different based on the call type. The following defines this field data:

| CALL TYPE | SECONDARY ID |
|---|---|
| Individual non-interconnect call receiver | Trunking individual ID of call |
| All talkgroup calls | Trunking talkgroup ID |
| Individual interconnect call | Not Applicable (Unused) |

When the Secondary ID field represent a talkgroup ID, the Secondary ID field can be considered to be a Talkgroup ID field.

A Target Affiliation Type field (1 octet) contains the type of the trunking group the target is currently affiliated to. In the preferred embodiment, affiliation type values are described above with respect to Requester Affiliation Types.

A Target Affiliated Group ID field (4 octets) contains the affiliated trunking group ID of the target individual. This field is not valid for all calls without a target individual ID (e.g., group calls). A Target Affiliated Zone ID field (1 octet) contains the Zone ID of the zone in which the target radio is currently operating. This field is not valid for all calls without a target individual ID (e.g., group calls). A Target Affiliated Site ID field (1 octet) contains the Site ID of the site in which the target radio is currently operating. This field is not valid for all calls without a target individual ID (e.g., group calls). A Target Protocol Type field (1 octet) contains the protocol type of the target. In the preferred embodiment, protocol types are described above.

A Timestamp field (8 octets) contains the time that the Call Activity Update Message was issued by the Zone Controller. In the preferred embodiment, the format of the timestamp, for whatever time the timestamp represents in any message described herein, is defined as follows, in bit sequence order:

| Year | 2 octets |
|---|---|
| Month | 1 octet |
| Day | 1 octet |
| Hour | 1 octet |
| Minute | 1 octet |
| Second | 1 octet |
| DeciSecond | 1 octet |

A Call Number field (2 octets) contains a number that is used to identify one call from start to finish. In the preferred embodiment, the Call Number ranges from 0 to 1500. The Call Number is used to track call activity packets easily. The Call Number is the reference utilized to associate start of call, end of call, and any updates in between for a particular call, and thus is extremely useful in many call tracking techniques, such as call billing and call logging.

A Source Site ID of Call field (1 octet) contains the site number that is currently sourcing audio on an active call. The Source Site ID of Call field is not necessarily the requester's affiliated site information. A Call Type field (1 octet) defines the general type of call that has started, which values, in the preferred embodiment, are:

| VALUE | CALL TYPE |
|---|---|
| 0 | Default value |
| 1 | Individual call such as interconnect or private call |
| 2 | Group call such as talkgroup or multi-group call |
| 3 | Data call |

An Interconnect Device Number field (1 octet) contains the interconnect device number that the current interconnect call is using. This field is not valid for a call that is not an interconnect type call. An Interconnect PLIC Number field (1 octet) contains the interconnect Phone Line Interface Card (PLIC) number that the current interconnect call is using. This field is not valid for a call that is not an interconnect type call. An Interconnect TRIC Number field (1 octet) contains the interconnect Trunked Repeater Interface Card (TRIC) number that the current interconnect call is using. This field is not valid for a call that is not an interconnect type call. The PLIC and TRIC are part of an interconnect switch 121 in the preferred embodiment.

A Decentralized Interconnect Device Number field (1 octet) contains the decentralized interconnect device number for a decentralized interconnect call. This field is not valid for a call that is not an interconnect type call. A Decentralized Phone Line Number field (1 octet) contains the phone line interface port number that is being used for a decentralized interconnect call. This field is defined for all decentralized interconnect calls that have a phone line assigned, including the transpond and ring state of the land to mobile interconnect call. A decentralized phone line number is not defined for a busy mobile to land decentralized interconnect call. This field is not valid for a call that is not an interconnect type call. A Decentralized Interconnect Channel Number field (1 octet) contains an ID of the channel at the site containing the decentralized phone line. This channel routes audio from the interconnect device into the system's audio switch for the decentralized interconnect call. This field is not valid for a call that is not an interconnect type call.

A CIU Number field (1 octet) contains the Console Interface Unit (CIU) number. In the preferred embodiment, a CIU translates 12 kilobit secure (encrypted) data into clear analog audio and vice versa. A CDL Number field (1 octet) contains the CDL (CIU Data Link) number. The CIU and CDL numbering scheme is similar to a site/channel relationship.

A DIU Number field (1 octet) contains the Digital Interface Unit (DIU) number. A DIU translates digital clear/secure data into clear analog audio and vice versa. A DBL field (1 octet) contains the Data Broadcast Link (DBL) number. The DIU and DBL numbering scheme is similar to a site/channel relationship.

A Secure Key Number field (2 octets) contains the secure key number for a secure call. A Secure Index Number field (1 octet) contains the secure key index for the secure key number.

An Active/Busy Status field (1 octet) contains the current state of the call. Values for the Active/Busy Status field are described as follows:

| VALUE | ACTIVE/BUSY STATUS |
|---|---|
| 0 | Default value |
| 1 | Global active |
| 2 | Global busy |
| 3 | Active and busy |
| 4 | No busy override on active and busy |
| 5 | Busy override on active and busy |

A Busy Reason field (1 octet) indicates why the call has been busied. In the preferred embodiment, reasons for busy values include:

| VALUE | BUSY REASON |
|---|---|
| 0 | Default value |
| 1 | Resource not available |
| 2 | Contention with private call |
| 3 | Contention with multi-group call |
| 4 | Contention with site-wide call |
| 5 | CIU not available |
| 6 | DIU not available |
| 7 | Interconnect unit not available |
| 8 | No busy, call is globally active |

A State Transition field (1 octet) indicates the type of state transition that has occurred. In the preferred embodiment, transition reasons and values include:

| VALUE | STATE TRANSITION |
|---|---|
| 0 | Unknown transition |
| 1 | Ring to Global Active |
| 2 | Ring to Global Busy |
| 3 | Ring to Active and Busy |
| 4 | Global Busy to Global Active |
| 5 | Global Busy to Active and Busy |
| 6 | Global Busy to Active and Busy due to Busy Override |

A Requested Site Information field (8 octets) indicates the sites needed for a call. This field includes all of the sites that are needed for a call to become globally active (i.e., no busy sites). In the preferred embodiment, this field contains a 64-bit site mask that contains a bit that corresponds to a site number. Bit position 0 represents site 1, bit position 1 represents site 2, bit position 2 represents site 3, and so forth.

A Busy/No Resources Site Information field (8 octets) indicates the sites that are currently busy and do not have a resource (but do have one or more capable resources that are all in use) to support the call. These sites do not have available resources in order to grant the call. In the preferred embodiment, this field is a 64-bit site mask, as described above with respect to the Requested Site Information field, where 1s represent sites that are busy and do not have a resource presently available. Therefore, if bit position 0 and bit position 3 were set to 1 in the 64-bit mask, it would indicate that site 1 (bit position 0) and site 4 (bit position 3) does not have a resource available to grant the call.

A Not Capable Site Information field (8 octets) indicates the sites that do not have a resource that is capable of supporting the type of call requested. An example of this type of site is a site that does not have a secure capable repeater to support a secure call. In the preferred embodiment, this field is a 64-bit site mask, as described above with respect to the Requested Site Information field, where 1s represent sites that do not have a resource that is capable of supporting the type of call requested.

An Active Site/Channel Information field (64 octets) indicates the sites and channels (at these sites) that are currently active in the present call. This field contains a 64-element array that contains the channel number for the call. The array position indicates the site number. The array is shown below:

| Site 1 | 0xff |
|---|---|
| Site 2 | Channel 5 |
| Site 3 | 0xff |
| . | Channel 12 |
| . | ... |
| . | ... |
| Site 64 | 0xff | where 0xff indicates that a channel is not assigned at this site.

A Controlling Zone Controlled Flag field (1 octet) is an enumeration that indicates whether or not the call is being controlled by a predetermined controlling zone (assigned via an HLR/VLR (Home Location Register/Visitor Location Register) mappings. In the preferred embodiment, this field is defined as follows:

| VALUE | FLAG |
|---|---|
| 0 | Default value |
| 1 | Predetermined Controlling Zone |

A Controlling Zone ID field (1 octet) contains the ID of the zone that is controlling the present call. A UCN field (4 octets) contains a Universal Call Number (UCN) that, when combined with the Controlling Zone ID, uniquely identifies a call across an entire multiple-zone system. The UCN field is important because it allows a call to be uniquely identified and tracked in its entirety across all zones in a multiple-zone system (if the call takes place in a multiple-zone system) and provides for call reconstruction and other useful call tracking functions. A Call Sequence Number field (2 octets) contains a number that uniquely identifies a call action within an active call with reference to other call actions within this active call in all zones. An Event Sequence Number field (2 octets) contains a number that uniquely identifies a call action with reference to any other call actions that occur during this call for the local zone only.

An IZAC Number field (1 octet) contains a number of the Inter-Zone Audio Channel (IZAC) that is being used for interzone communication. An Interconnect Phone State field (1 octet) indicates the state an interconnect call is in. In the preferred embodiment, valid interconnect phone states are:

| VALUE | STATE |
|---|---|
| 0 | Default value, when the field is not applicable for a call |
| 1 | Transpond state |
| 2 | Busy state |
| 3 | Busy and ring state |
| 4 | Busy previously ring state |
| 5 | Busy previously active state |
| 6 | Ring state |
| 7 | Active state |

A Busy Resource Bitmap field (2 octets) is a bitmap field that indicates the type of resources that are busied for an active or busy call. A bit that is set to 1 indicates that the corresponding resource type is busied. A Busy Zone Contributing flag field (1 octet) contains an enumeration that indicates whether or not the local zone is contributing to the busy condition of the call. In the preferred embodiment, this field is defined as follows:

| VALUE | FLAG |
| --- | --- |
| 0 | Zone is not contributing to busy |
| 1 | Zone is contributing to busy |

A Local Zone ID field (1 octet) contains the ID of the local zone that logged this message. A Zone Manager field (32 octets) contains 32 octets of data that are reserved for use by the zone manager 107 for uses such as additional call data transfer as may be needed in the future.

The format and data associated with the Manager Packet 213 for the Call Activity Message are as follows. A Primary Alias field (16 octets) contains the radio user name, or system database alias, for the radio in Primary ID field. A Secondary Alias field (16 octets) contains either a Talkgroup Alias (if the call is a group call) or target radio user name (if the call is an individual call) for the Secondary ID field. A Requester Affiliated Talkgroup ID Alias field (16 octets) contains an affiliated talkgroup alias for the radio in the Primary ID field. A Target Affiliated Talkgroup ID Alias field (16 octets) contains an affiliated talkgroup alias for the target radio in the Secondary ID field (applicable only if the call is an individual call). A Primary Security ID field (2 octets) contains a security group ID for the Primary ID. A security group is an agency or organization, such as police department, fire department, armed forces, government agency, or other organized entity, that has communication and management control over a set of talkgroups. A Secondary Security ID field (2 octets) contains a security group ID for the Secondary ID. A Requester Affiliated Security ID field (2 octets) contains a security group ID for the Affiliated Talkgroup of the Primary ID. A Target Affiliated Security ID field (2 octets) contains a security group ID for the Target Affiliated ID in the case when the call type is individual.

Another type of service utilization message is the End of Call Message. An End of Call Message is generated when a call or busy has ended. The only data necessary is the call associated call number and a timestamp. Because update packets are continually sent, all the necessary logging data can now be derived. Calls are identified by a Universal Call Number so that all packets pertaining to a single call can be traced. After an End of Call Message, the Universal Call Number may be reused to identify a new call.

In the preferred embodiment, the Block Opcode 209 information for an End of Call Message is as follows.

| VALUE | BLOCK OPCODE DESCRIPTION |
| --- | --- |
| 1 | End of call. |

The format and data associated with the Controller Packet 211 for the End of Call Message are as follows.

A Call Number field (2 octets) contains a number that is used to identify one call from start to finish. In the preferred embodiment, the Call Number ranges from 0 to 1500 and is a 16-bit value. This number is reused as quickly as possible. An example of this reuse would be, if there was only one call on the system, for instance, call number 0 (zero), and when this call ends, the next call number to be used would be call number 0 (zero). This number is used to track update packets easily. The Call Number is the reference utilized to associate start of call, end of call, and any updates in between for a particular call, and thus is extremely useful in many call tracking techniques, such as call billing and call logging.

An End of Call Reason field (1 octet) contains the reason why the call has ended. In the preferred embodiment, the following are reasons for ending a call:

| VALUE | END OF CALL REASON |
| --- | --- |
| 0 | No reason to end the call |
| 1 | Talkgroup landline reject |
| 2 | Individual landline reject |
| 3 | Mobile reject ISW (Inbound Signalling Word) |
| 4 | Transpond OSW timer expired |
| 5 | Ring OSW (Outbound Signalling Word) timer expired |
| 6 | Final timer for individual interconnect call expired |
| 7 | Phone line termination command received for call line |
| 8 | Phone line seize command received for call line |
| 9 | Switch failed or repeater going wide area |
| 10 | Site or channel out of service |
| 11 | Phone line out of service |
| 12 | TRIC out of service |
| 13 | Channel preempted |
| 14 | TRIC preempted |
| 15 | Multi-Group (MG) requested interrupt |
| 16 | Emergency request on non-emergency TG |
| 17 | Interconnect unit failed |
| 18 | Disconnect completed |
| 19 | Busy cleanup |

A Local Zone ID field (1 octet) contains the ID of the local Zone that logged this message.

A Timestamp field (8 octets) contains the time that the End of Call message was issued by the Zone Controller. A Controlling Zone Controlled Flag field (1 octet) is an enumeration that indicates whether or not the call is being controlled by a predetermined controlling zone (assigned via an HLR/VLR (Home Location Register/Visitor Location Register) mappings. In the preferred embodiment, the only type of calls that are controlled by a zone other than the predetermined controlling zone are group calls. In the preferred embodiment, this field is defined as follows:

| VALUE | FLAG |
| --- | --- |
| 0 | Default value |
| 1 | Predetermined Controlling Zone |

A Controlling Zone ID field (1 octet) contains the ID of the zone that is controlling the present call. A UCN field (4 octets) contains a Universal Call Number (UCN) that, when combined with the Controlling Zone ID, uniquely identifies a call across an entire multiple-zone system. The UCN field is important because it allows a call to be tracked in its entirety across all zones in a multiple zone system. A Call Sequence Number field (2 octets) contains a number that uniquely identifies a call action within an active call with reference to other call actions within this active call in all zones. An Event Sequence Number field (2 octets) contains a number that uniquely identifies a call action with reference to any other call actions that occur during this call for the local zone only.

The Manager Packet 213 for the End of Call Message comprises a Zone Manager field (34 octets) that contains 34 octets of data that are reserved for use by the zone manager 107 for uses such as described above. Throughout the present invention, Zone Manager fields and Zone Controller fields, wherever utilized, may be filled with zeros or ones, if the zone manager 107/zone controller 111 has no information to include.

Another type of service utilization message is the Radio Status Traffic Message, which contains radio activity that is not related to call activity. This message contains responses to radio commands, emergency alarm events from radios, radio affiliations, and so forth. In the preferred embodiment, the Block Opcode 209 information for a Radio Status Traffic is as follows.

| VALUE | BLOCK OPCODE DESCRIPTION |
|---|---|
| 0 | Default Value (N/A) |
| 1 | Radio ACK (Acknowledgment) for regroup or cancel talkgroup regroup radio command |
| 2 | Radio ACK for regroup or cancel multi-group regroup radio command |
| 3 | Zone Controller requests affiliation from a radio |
| 4 | Radio is acknowledging inhibit command (disabled) |
| 5 | Radio ACKs on cancel inhibit command (enabled) |
| 6 | Radio ACKs on selector lock command (group selector knob is disabled if the radio is regrouped) |
| 7 | Radio ACKs on cancel selector lock command (group selector knob is enabled) |
| 8 | Radio sent an emergency alarm |
| 9 | Radio sent a status |
| 10 | Radio sent a message |
| 11 | Radio is affiliated |
| 12 | Radio requests cancel regroup or cancel selector lock |
| 13 | Radio has alerted another radio |
| 14 | Radio being alerted is ACKing |
| 15 | Busy override |
| 16 | Radio was rung for a private call |
| 17 | Radio being private called is acknowledging |
| 18 | Group regroup started |
| 19 | Group regroup ended |
| 20 | Radio's request was rejected |
| 21 | Radio has entered an emergency mode |
| 22 | Radio has deaffiliated |

The format and data associated with the Controller Packet 211 for the Radio Status Traffic Message are as follows.

A Primary ID field (4 octets) contains either a trunking individual ID of the radio sourcing the audio for the present call or a trunking talkgroup ID. In the preferred embodiment, this field represents a talkgroup ID if the block opcode is 18 or 19, and represents an individual ID for all other opcodes. A Requester Affiliation Type field (1 octet) contains the type of the trunking group to which the requester is currently affiliated. In the preferred embodiment, the affiliation type values are described above. A Requester Affiliated Group ID field (4 octets) contains the affiliated trunking group ID of the requesting individual. All Radio Status Traffic Messages without a requester individual ID contain an Unused ID value in this field, which is 0xFFFFFFFF in the preferred embodiment. A Requester Affiliated Zone ID field (1 octet) contains the ID of the zone at which the individual is currently located. All Radio Status Traffic Messages without a requester individual ID contain an Unused Zone value in this field, which is 0xFF in the preferred embodiment. A Requester Affiliated Site ID field (1 octet) contains the ID of the site at which the individual is currently located. All Radio Status Traffic Messages without a requester individual ID contain an Unused Site value in this field, which is 0xFF in the preferred embodiment. A Requester Protocol Type field (1 octet) contains the protocol type of the requester. In the preferred embodiment, the protocol types and values are described above.

A Requester Device Type field (1 octet) contains the type of device the requester ID is associated with. In the preferred embodiment, device type values include:

| VALUE | DEVICE TYPE |
|---|---|
| 0 | Default value |
| 1 | Console request |
| 2 | Radio request |
| 3 | Centralized landline request |
| 4 | Decentralized landline request |
| 5 | Zone Controller request |

A Radio Type Qualifiers field (4 octets) contains flags that indicate the type of call that has been started. These flags may be combined to allow for a multitude of call types to be generated. In the preferred embodiment, radio type qualifiers values are described above.

A Secondary ID field (4 octets) contains a trunking individual ID, a trunking talkgroup ID, or the Unused ID value. The block opcode determines the secondary ID value. In the preferred embodiment, the following defines the Secondary ID field:

| BLOCK OPCODE | SECONDARY ID |
|---|---|
| 13, 14 | Trunking individual ID of Call Back Radio |
| 16, 17, 24, 25 | Private call target radio |
| 18, 19 | Trunking talkgroup of target talkgroup |
| 1, 8, 9, 10, 11, 12, 21 | Trunking talkgroup of active talkgroup |
| All other opcodes | Unused ID value |

A Target Affiliation Type field (1 octet) contains the type of the trunking group the target is currently affiliated to. In the preferred embodiment, affiliation type values are described above.

A Target Affiliated Group ID field (4 octets) contains the ID of the trunking group with which the target individual is currently affiliated. This field is not valid for all calls without a target individual ID (e.g., group calls). All Radio Status Traffic Messages without a target individual ID contain the Unused ID value in this field. A Target Affiliated Zone ID field (1 octet) contains the Zone ID of the zone in which the target radio is currently operating. All Radio Status Traffic Messages without a target individual ID contain the Unused Zone value in this field. A Target Affiliated Site ID field (1 octet) contains the Site ID of the site in which the target radio is currently operating. This field is not valid for all calls without a target individual ID (e.g., group calls). All Radio Status Traffic Messages without a target individual ID contain the Unused Site value in this field. A Target Protocol Type field (1 octet) contains the protocol type of the target. In the preferred embodiment, protocol types are described above.

A Deaffiliation Reason field (1 octet) contains any generic reason codes such as deaffiliation reasons. A Timestamp field (8 octets) contains the time that the Radio Status Traffic Message was issued by the Zone Controller. A Subscriber Reject Reason field (2 octets) indicates the reason for a subscriber reject. In the preferred embodiment, possible reasons include:

| VALUE | REJECT TYPE DESCRIPTION |
|---|---|
| 0xFF | No reject |
| 0x01 | Target ID is invalid |
| 0x02 | Requester ID is disabled or not allowed to access the system |
| 0x03 | Target ID is disabled or not allowed to access the system |
| 0x04 | Talkgroup ID is invalid |
| 0x05 | Talkgroup is disabled |
| 0x06 | Target talkgroup ID is invalid |
| 0x07 | Target talkgroup is disabled |
| 0x10 | Requester unable to make site-wide request |
| 0x11 | Requester not allowed to make multi-group calls |
| 0x12 | Coded request made on a clear only (i.e., unencrypted) group or by an individual who is clear only |
| 0x13 | Requester not allowed to make talkgroup calls |
| 0x14 | Requester not allowed to make private calls |
| 0x15 | Target ID not allowed to make or receive private calls |
| 0x16 | Interconnect feature disabled for individual ID |
| 0x17 | Coded PC call made to a target ID who is clear only |
| 0x18 | Clear request made on a coded only group or by an individual who is coded only |
| 0x19 | Target ID is coded only |
| 0x20 | No resources are capable to support request |

A Status/Message Number field (1 octet) contains the status/message number that is sent from the radio. In the preferred embodiment, the Status/Message Number field includes status numbers ranging from 1 to 8 for a block opcode value of 9 and message numbers ranging from 1 to 16 for a block opcode value of 10. For all other block opcode values, the field contains the Unused Number value, which is 0xFF in the preferred embodiment.

A Call Type field (1 octet) indicates the general type of call associated with the event. In the preferred embodiment, if the block opcode value is 20, this field indicates the type of call that caused the reject to occur. A Sites in Status field (8 octets) indicates all of the sites at which this status has occurred. In the preferred embodiment, this field contains a 64-bit site mask that contains a bit that corresponds to a site number. Bit position 0 represents site 1, bit position 1 represents site 2, bit position 2 represents site 3, and so forth. Therefore, in the case of the Sites in Status mask, if bit position 0 and bit position 3 were set to 1 in the 64-bit mask, it would indicate that the indicated status was issued at site 1 (bit position 0) and site 4 (bit position 3).

A Requesting Zone ID field (1 octet) contains the ID of the Zone from which the event is originating. This field is primarily used for events (e.g., emergency alarms) that have packets logged in multiple zones. This field identifies the zone that is the source of the event.

A Controlling Zone ID field (1 octet) contains the ID of the zone that is controlling the event. A UCN field (4 octets) contains a Universal Call Number (UCN) that, when combined with the Controlling Zone ID, uniquely identifies a call or event across an entire multiple-zone system. The UCN field is important because it allows a call to be tracked in its entirety across all zones in a multiple zone system.

A Second Zone ID field (1 octet) can represent two types of Zone ID's: a rejecting zone ID or a target zone ID. A rejecting zone ID identifies the zone that caused a reject event. In the preferred embodiment, the interpretation of this field is based a given block opcode value.

A Local Zone ID field (1 octet) contains the ID of the local zone that logged this message. A Console ID field (3 octet) contains the console operator address.

The format and data associated with the Manager Packet 213 for the Radio Status Traffic Message are as follows. A Primary Alias field (16 octets) contains the radio user name, or system database alias, for the radio in Primary ID field. A Secondary Alias field (16 octets) contains either a Talkgroup Alias (if the call is a group call) or target radio user name (if the call is an individual call) for the Secondary ID field. A Requester Affiliated Talkgroup ID Alias field (16 octets) contains an affiliated talkgroup alias for the radio in the Primary ID field. A Target Affiliated Talkgroup ID Alias field (16 octets) contains an affiliated talkgroup alias for the target radio in the Secondary ID field (applicable only if the call is an individual call). A Primary Security ID field (2 octets) contains a security group ID for the Primary ID. A Secondary Security ID field (2 octets) contains a security group ID for the Secondary ID. A Requester Affiliated Security ID field (2 octets) contains a security group ID for the Affiliated Talkgroup of the Primary ID. A Target Affiliated Security ID field (2 octets) contains a security group ID for the Target Affiliated ID in the case when the call type is individual.

Another type of service utilization message is the Interconnect Call Information Message, which contains billing information such as phone number, duration, and so forth for a call. The Interconnect Call Information Message is issued upon termination of an interconnect call by the interconnect switch 121 or a repeater, such as an IntelliRepeater™ base station available from Motorola, Inc., at one of the sites 115, 117, or 119. In the preferred embodiment, interconnect devices include interconnect switches 121 and repeaters, such as IntelliRepeater™ base stations, that are able to provide telephone interconnect functions with the PSTN. In the preferred embodiment, the Block Opcode 209 information for the Interconnect Call Information Message is as follows.

| VALUE | BLOCK OPCODE DESCRIPTION |
|---|---|
| 0 | Default value, N/A |
| 1 | Call was made through an interconnect switch |
| 2 | Call was made through a repeater |

The format and data associated with the Controller Packet 211 for the Interconnect Call Information Message are as follows.

A Subscriber ID field (4 octets) contains the ID of the radio/talkgroup involved in the interconnect call. A Duration field (2 octets) contains the duration of the interconnect call in seconds. A Call Type field (1 octet) describes the type of interconnect call. In the preferred embodiment, the Call Type field is represented by one ASCII character: L for landline-to-mobile calls, M for mobile-to-landline calls, and T for landline-to-talkgroup calls. A Phone Number field (17 octets) represents the landline phone number for the call. In the preferred embodiment, the Phone Number field is represented in up to 16 ASCII characters.

A Call Feature field (1 octet) indicates special calling features used for the call. In the preferred embodiment, 8 bits, 'daitfchw', indicate the active call feature, where 'd' is the most significant bit. The following describes the meaning of each bit.

| VALUE | MEANING |
|---|---|
| d | data capable call: 0 = normal mode, 1 = echo cancelled or automatic gain control disabled |
| a | answer supervision: 0 = not available, 1 = Central Office supplied |
| i | international call: 0 = no, 1 = yes |

-continued

| VALUE | MEANING |
|---|---|
| t | no-answer transferred: 0 = no, 1 = yes |
| f | all call forwarded: 0 = no, 1 = yes |
| c | conference call: 0 = no, 1 = yes |
| h | call put on hold: 0 = no, 1 = yes |
| w | call waiting indicator used: 0 = no, 1 = yes |

An Interconnect Device ID field (2 octets) contains site ID and channel number for Interconnect Call Information Messages issued by repeaters, and interconnect switch ID and PLIC information for Interconnect Call Information Messages issued by an interconnect switch 121. In the preferred embodiment, the PLIC information is a bitmap describing the module number, slot number and port number that was used for the call, in the format 'msssspppp'. The following describes this bit usage.

| m | module number: 0 = primary, 1 = secondary |
|---|---|
| ssss | slot number: 1–14 |
| ppp | port number: 0–7 |

The PLIC information may also be transmitted as a single number rather than a bitmap.

A Port Group ID field (1 octet) contains the port group ID used for the interconnect call. A Route Number field (1 octet) contains the route number used for the interconnect call. In the preferred embodiment, the Route Number field is empty, because it is set aside for future use. A Timestamp field (8 octets) contains the time that the Interconnect Call Information Message was detected.

The format and data associated with the Manager Packet 213 for the Interconnect Call Information Message are as follows. A Zone Manager field (34 octets) contains 34 octets of data that are reserved for use by the zone manager 107 for uses such as described above. A Subscriber Alias field (16 octets) contains the alias of the radio/talkgroup involved in the interconnect call. A Primary Security ID field (2 octets) contains a security group ID for the user who is making the phone call. A Zone Manager field (2 octets) contains 2 octets of data that are reserved for use by the zone manager 107 for uses such as described above.

Another type of service utilization message is the System Activity Event Message, which is used by the zone controller 111 to inform the a system dispatcher about significant system level activity. In the preferred embodiment, the Block Opcode 209 information for the System Activity Event Message is as follows.

| VALUE | BLOCK OPCODE DESCRIPTION |
|---|---|
| 0 | Default value |
| 1 | Control channel update information |
| 2 | Start of voice on control channel information |
| 3 | End of voice on control channel information |
| 4 | Start of background system ID information |
| 5 | End of background system ID information |
| 6 | ZC status update information |

The format and data associated with the Controller Packet 211 for the System Activity Event Message are as follows.

A Site Number field (1 octet) contains the site number associated with the system activity. The site number has no meaning for the block opcode value of 6 in the preferred embodiment. A Channel Number field (1 octet) contains the channel number associated with the system activity. The channel number has no meaning for the status update (block opcode value of 6) in the preferred embodiment. A System Activity Reason (Single-Zone System) field (1 octet) contains the reason why, in a single-zone system, VOC (voice on control channel, i.e., where voice transmissions are temporarily communicated over the control channel) usage has been changed and, in the preferred embodiment, the reason for a status update (block opcode value of 6). In the preferred embodiment, the possible reasons for VOC change and status update (block opcode value of 6), as applicable to single-zone systems, include:

| VALUE | SYSTEM ACTIVITY REASON |
|---|---|
| 0 | Default value |
| 1 | Radio Control Manager (RCM) requested |
| 2 | VOC due to voice channel failure |
| 3 | VOC due to Base Station ID |
| 4 | VOC due to call assignment |

| VALUE | STATUS UPDATE REASON |
|---|---|
| 0 | ZC status unknown |
| 1 | ZC active |
| 2 | ZC disabled |
| 3 | ZC has no links to any sites |

A Local Zone ID field (1 octet) contains the ID of the local zone that logged this message. A Timestamp field (8 octets) contains the time that the message was logged.

An Interzone (IZ) Bitmap field (2 octets) contains a bitmap that indicates the state of the non-voice link between the local zone and all other zones. A bit which is set to 1 indicates that the local zone is capable of non-voice communications with the remote zone represented by that bit. A Zone Controller Status Bitmap field (1 octet) contains a bitmap field that describes the state of the zone controller 111. In the preferred embodiment, this field is represented as follows, where different values are used for single zone and multiple-zone systems:

| VALUE | DESCRIPTION FOR SINGLE-ZONE SYSTEMS |
|---|---|
| 0 | Default Value |
| 1 | ZC is up and active |
| 2 | ZC is down and disabled |
| 3 | ZC has no connection to any sites (idle) |

| VALUE | DESCRIPTION FOR MULTIPLE-ZONE SYSTEMS |
|---|---|
| 0 | Default Value |
| 0x1 | ZC is active if the bit is on |
| 0x2 | ZC is disabled if the bit is on (mutually exclusive with active bit) |
| 0x4 | ZC has no connection to any sites (idle) if the bit is on |
| 0x8 | ZC is interzone trunking capable if the bit is on |

A System Activity Reason (Multiple-Zone System) field (1 octet) contains the reason why, in a multiple-zone system, VOC (voice on control channel) usage has been changed and, in the preferred embodiment, the reason for a status update (block opcode value of 6). In the preferred embodiment, the possible reasons for VOC change and status update (block opcode value of 6), as applicable to multiple-zone systems, include:

| VALUE | SYSTEM ACTIVITY REASON |
|---|---|
| 0 | Default value |
| 1 | Radio Control Manager (RCM) requested |
| 2 | VOC due to voice channel failure |
| 3 | VOC due to Base Station ID |
| 4 | VOC due to call assignment |
| 5 | Zone status has changed |
| 6 | Interzone data path status changed |

| VALUE | STATUS UPDATE REASON |
|---|---|
| 0x00 | ZC status unknown |
| 0x01 | ZC active |
| 0x02 | ZC disabled |
| 0x04 | ZC has no links to any sites (idle) |
| 0x08 | Local zone is inter-zone trunking capable |

A Zone Controller field (4 octets) that contains 4 octets of data that are reserved for use by the zone controller 111 for uses such as additional call data transfer as may be needed in the future.

The Manager Packet 213 for the System Activity Event Message comprises a Zone Manager field (32 octets) that contains 32 octets of data that are reserved for use by the zone manager 107 for uses such as described above.

Another type of service utilization message is the Radio Command Message, which contain commands that are issued by the Radio Control Manager (RCM) or Computer Aided Dispatcher (CAD) and directed to a particular radio. The response from the radio for each of these commands, if any, is contained in the Radio Status Traffic Message, as described above. In the preferred embodiment, the Block Opcode 209 information for the Radio Command Message is as follows.

| VALUE | BLOCK OPCODE DESCRIPTION |
|---|---|
| 1 | Radio is being regrouped to a talkgroup |
| 2 | Radio is being regrouped to a multi-group |
| 3 | Radio is being cancelled from a previously regrouped talkgroup or multi-group |
| 4 | Radio is being inhibited (disabling) |
| 5 | Radio is being cancelled from a previous inhibition (enabling) |
| 6 | Radio's talkgroup selector knob is being locked (disabling) |
| 7 | Radio's talkgroup selector knob is being unlocked (enabling) |
| 8 | System ACK of an emergency alarm event from a radio |
| 9 | System ACK of status event from a radio |
| 10 | System ACK of message event from a radio |
| 11 | Radio is being checked for its affiliation status |
| 12 | System ACK of change radio event from a radio |
| 256 | Radio's dynamic failsoft setting is being assigned |
| 257 | Radio's dynamic failsoft setting is being cancelled |
| 258 | Fixed end is being checked for its affiliation status of a particular radio |

The format and data associated with the Controller Packet 211 for the Radio Command Message are as follows.

A Primary ID field (4 octets) contains a trunking individual ID of the radio involved in the command, e.g., a radio being regrouped or inhibited. A Secondary ID field (4 octets) contains additional ID information. In the preferred embodiment, the Secondary ID field is different base on the type of opcode, as follows.

| OPCODE | SECONDARY ID |
|---|---|
| 1 | Trunking talkgroup ID |
| 2 | Trunking multi-group ID |
| Other | Not Applicable |

A Status/Message ACK Number field (1 octet) contains the status/message number that is being acknowledged for event acknowledgments, such as for opcodes with values 9 and 10, in the preferred embodiment. Status numbers range from 1 to 8 when the opcode value is 9 (status events), and message numbers range from 1 to 16 when the opcode value is 10 (message events)in the preferred embodiment. This field is not valid for all other opcodes in the preferred embodiment. A Command Number field (4 octets) contains a number that is used to uniquely specify each command from a given source to allow subsequent association of other command messages associated with this command.

The format and data associated with the Manager Packet 213 for the Radio Command Message are as follows. A Zone Manager field (34 octets) contains 34 octets of data that are reserved for use by the zone manager 107 for uses such as described above. A Primary Alias field (16 octets) contains the System database alias of the radio involved in the command, i.e. a user name who is assigned the radio. A Secondary Alias field (16 octets) contains the System database alias for the entity described in the Secondary ID field. If the Secondary ID field is not applicable, then the Secondary Alias field content is not valid. A Primary Security ID field (2 octets) contains a security group ID for the radio in the Primary ID field. A Secondary Security ID field (2 octets) contains a security group ID for the talkgroup in the Secondary ID A Timestamp field (8 octets) contains the time when the Radio Command Message was issued by the Zone Manager.

In the preferred embodiment, single octet align pads are used to align fields to 16-bit word boundaries. In the preferred embodiment, align pads are inserted in Call Activity Messages after the Requester Affiliation Type, Target Affiliation Type, and Target Protocol Type fields. In the preferred embodiment, align pads are inserted in Radio Status Traffic Messages after the Requester Affiliation Type and Target Affiliation Type fields. In the preferred embodiment, an align pad is inserted in Interconnect Call Information Messages after the Call Feature field. In the preferred embodiment, an align pad is inserted in Radio Command Messages after the Status/Message ACK Number field. The align pads could be used to supply other meaningful data in the future.

A bit field representation of a service utilization linking message is shown in FIG. 4. The header comprises a Block Source Field 401, a Block Destination Field 403, a Block Length Field 405, and a Block Command Type Field 407. In the preferred embodiment, the Block Source Field 401, the Block Destination Field 403, the Block Length Field 405, and the Block Command Type Field 407 are the same size and are used in the same ways as the Block Source Field 201, the Block Destination Field 203, the Block Length Field 205, and the Block Command Type Field 207 of the service utilization message of FIG. 2, thus the descriptions of these fields with respect to FIG. 2 are usable for FIG. 4 as well.

The service utilization linking message also contains a service controller linking packet, which comprises a Block Opcode Field 409 and a Controller Packet 411. The Block Opcode Field 409 is similar to the Block Opcode Field 209 of FIG. 2, and is two octets in length and indicates what function is being performed by the service utilization linking message. The Block Opcode Field 409 also indicates what the subsequent data is and how it should be interpreted. The Block Opcode Field 409 varies depending on the Block Command Type 407 for the message. Various Block Opcode Fields 409 will be described below with respect to particular command types. The Controller Linking Packet 411 varies in length and generally provides information related to interzone communications. Various Controller Linking Packets 411 will be described below with respect to particular command types.

The service utilization message also contains a service manager packet, which comprises a Manager Linking Packet 413 and a Block Sequence Number Field 415. The Manager Linking Packet 413 varies in length and generally provides subscriber names, e.g., individual and talkgroup names, and agency IDs. Various Manager Linking Packets 413 will be described below with respect to particular command types. The Block Sequence Number 415, similar to the Block Sequence Number 215 of FIG. 2, is four octets in length. A wrapping counter specifies the Block Sequence Number 415 of the message. In the preferred embodiment, this field is an unsigned field and the first packet after system start-up is given sequence number 1, then it counts up to a maximum value for a 4-octet number, after which the number will roll back to 1.

Figure 5:
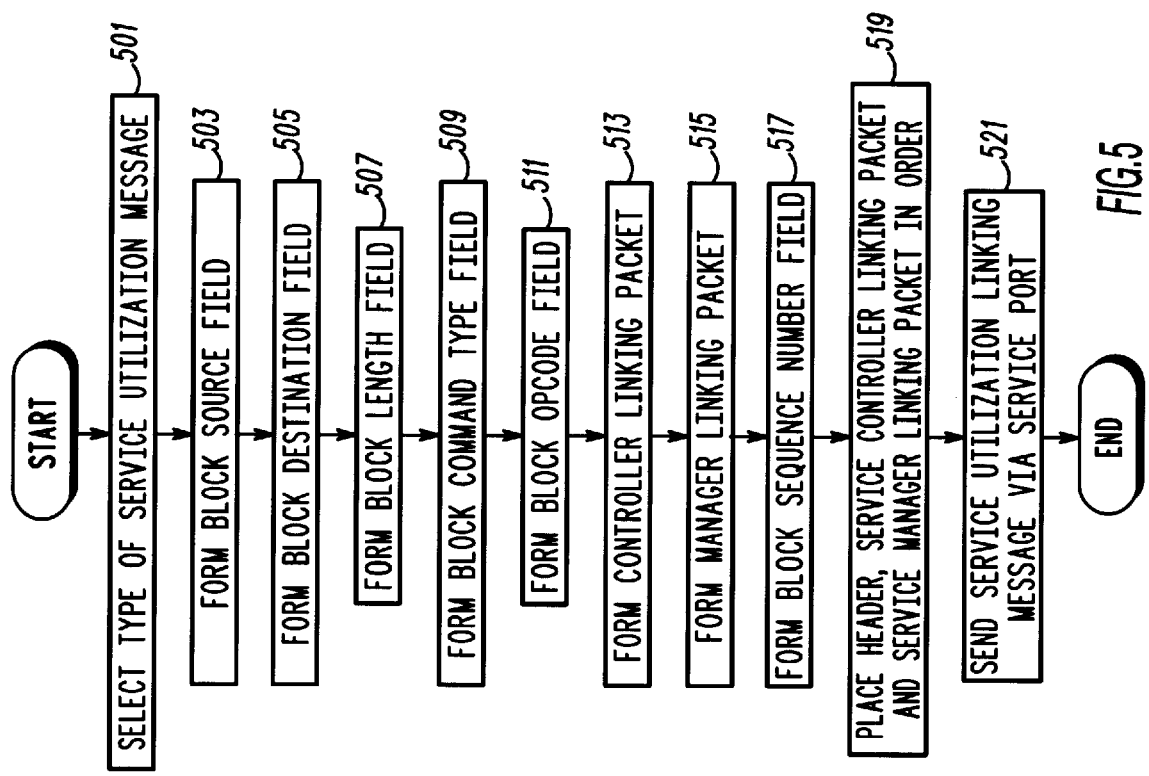
FIG. 5 is a flowchart showing a method of forming a service utilization linking message in accordance with the invention.

A method of sending a service utilization linking message in a communication system is shown in the flowchart of FIG. 5. At step 501, the type of service utilization linking message is selected. Various types of service utilization linking messages are described below. The header is created by forming the Block Source Field 401 at step 503, the Block Destination Field 403 at step 505, the Block Length Field 405 at step 507, and a Block Command Type Field 407 at step 509, which fields are described with respect to FIG. 4 above. The service controller linking packet is created by forming the Block Opcode Field 409 at step 511, as described with respect to FIG. 4 above, and at step 513 the Controller Linking Packet 411 by selecting the Controller Linking Packet 411 that is utilized for the type of service utilization linking message selected at step 501. The service manager linking packet is created by forming, at step 515, the Manager Linking Packet 413 that is utilized for the type of service utilization linking message selected at step 501, and forming at step 517 the Block Sequence Number Field 415, as described with respect to FIG. 4 above. At step 519, the header, service controller linking packet, service manager linking packet, and fields therein are placed in the order as shown in FIG. 4. 2, thereby forming a completed service utilization linking message. At step 521, the completed service utilization linking message is then sent via the service port 109.

Various types of service utilization linking messages include Controlling Zone Update Messages and Resource Removed Messages. These messages are described in detail as follows. The fields and field lengths are described below in the exact order and length as they are utilized in the preferred embodiment. One of skill in the art would be able to modify the field lengths and ordering to obtain a successful protocol, however, the protocol reader 125 (receiving device) must know the field lengths and field order to be able to successfully receive and decode the information.

One type of service utilization linking message is the Controlling Zone Update Message, which is used to report the interzone call information in the multiple-zone systems. This message correlates all interzone call information changes from start to end. In the preferred embodiment, the Block Opcode 209 information for the Controlling Zone Update Message is as follows.

| VALUE | BLOCK OPCODE DESCRIPTION |
|---|---|
| 0 | Default value |
| 1 | Start of interzone call |
| 2 | Specified individual (primary ID) has initiated the call and sourcing audio for the call |
| 3 | Specified individual has initiated a PTT on an active call but does not control the call |
| 4 | Specified individual initiated a PTT on a busy call |
| 5 | Busy call has been converted to active (or active and busy) |
| 6 | Zone level information has changed for the call (i.e., zone removed from or added to a call) |
| 7 | Call has ended in all zones |
| 8 | Start of group regrouping |
| 9 | End of group regrouping |
| 10 | Specified individual triggered an emergency alarm |
| 11 | Change of the call status |

The format and data associated with the Controller Packet 411 for the Controlling Zone Update Messages are as follows.

A Primary ID field (4 octets) contains the trunking individual ID of the radio involved in the event. A Secondary ID field (4 octets) contains the ID of the target of the event. In the preferred embodiment, the Secondary ID may be a trunking individual ID, a trunking group ID, or an unused field depending on the value of the Block Opcode, Radio Type Qualifier, and Call Type fields, and includes the block opcode values 1, 2, 3, 4, 5, and 7.

An Inter-Zone Audio Channel (IZAC) Number List field (16 octets) contains a list (octets 0 to 15) of the IZAC in each zone that is being used for the call. Octet n of the list contains the IZAC of zone (n+1). A Sourcing Zone ID field (1 octet) contains the ID of the zone that contains the requester of the event. For start and end group regrouping, this zone ID indicates the zone ID of the controlling console operator. A Controlling Zone ID field (1 octet) contains the ID of the zone that is controlling the call. A UCN field (4 octets) contains a Universal Call Number (UCN) that, when combined with the Controlling Zone ID, uniquely identifies a call or event across an entire multiple-zone system. The UCN field is important because it allows a call to be tracked in its entirety across all zones in a multiple zone system.

A Call Sequence Number field (2 octets) contains a number that uniquely identifies the event within the call being logged. An Overall Call Status field (1 octet) indicates the overall status of the call. The call is considered active as long as the call is active in at least one zone. An End of Call Reason field (1 octet) indicates the reason why the call ended. In the preferred embodiment, various reasons why the call ended are described above. A Busy Reason field (1 octet) indicates the reason why the call was busied. In the preferred embodiment, various reasons why the call was busied are described above. A Call Type field (1 octet) indicates the general type of call that being logged. In the preferred embodiment, various call types are described above. A Radio Type Qualifiers field (4 octets) contains flags that indicate the type of radio event that is being logged. In the preferred embodiment, various Radio Type Qualifiers are described above.

An Eligible Zone Bitmap field (2 octets) includes a bitmap that indicates which zones are eligible to participate in the event. The eligible zones are calculated by using the registered zone databases for groups and individuals. A bit set to 1 indicates that the corresponding zone is eligible.

A Participating Zone Bitmap field (2 octets) includes a bitmap that indicates which zones are participating in the event. The participating zones include all eligible zones that accepted the request to participate and are in interzone communications. A bit which is set to 1 indicates that the corresponding zone is participating.

An Active or Busy Contributing Zone Bitmap field (2 octets) includes a bitmap of zones that are either active or busy in the call. A Timestamp field (8 octets) contains the time that the message was logged.

A Console ID field (3 octet) contains the console operator address. A State Transition field (1 octet) contains the current state of the call. The transition reasons and values in the preferred embodiment are described above.

The format and data associated with the Manager Packet 413 for the Controlling Zone Update Message are as follows. A Zone Manager field (34 octets) contains 34 octets of data that are reserved for use by the zone manager 107 for uses such as described above. A Primary Alias field (16 octets) contains the radio user name for the Primary ID. A Secondary Alias field (16 octets) contains the radio user name (if the call type is individual) or talkgroup alias (if the call type is group) for the Secondary ID. A Primary Security ID field (2 octets) contains a security group ID for the Primary ID. A Secondary Security ID field (2 octets) contains a security group ID for the Secondary ID.

Another type of service utilization linking message is the Resource Removed Message, which is used to indicate when a locked resource is removed during setup of an active call, which may occur when resources fail or resources are preempted by a higher priority call. In the preferred embodiment, the Block Opcode 209 information for the Resource Removed Message is as follows.

| VALUE | BLOCK OPCODE DESCRIPTION |
| --- | --- |
| 0 | Default value |
| 1 | Resource failed |
| 2 | Resource preempted |

The format and data associated with the Controller Packet 411 for the Resource Removed Message are as follows.

A Preempted Failed Controlling Zone ID field (1 octet) contains the controlling zone ID of the call that has preempted the current call. A Preempting Controlling Zone ID field (1 octet) contains the ID of the zone that has control over the call. A Preempted Failed UCN field (4 octets) contains a Universal Call Number, which number here represents the UCN of the preempted call. A Preempting UCN field (4 octets) contains a Universal Call Number, which number here represents the UCN of the preempting call that caused the resources to be removed.

A Preempted Failed RTQ (Radio Type Qualifier) field (4 octets) contains a bitmap describing the type of call (Radio Type Qualifier) from which resources were removed. A Preempting RTQ field (4 octets) contains a Radio Type Qualifier bitmap describing the type of the preempting call that caused the resource to be removed. A Preempted Failed Call Type field (1 octet) indicates the general type of call from which the resources were removed. A Preempted Call Type field (1 octet) indicates the general type of call that caused the resource to be removed. A Resource Removed Bitmap field (2 octets) contains a bitmap field that indicates the type of resources that were removed. A bit which is set to 1 indicates that the associated resource type was removed in the preferred embodiment.

An Interconnect Device Number field (1 octet) contains the interconnect device number that the current centralized interconnect call is using. If this field is not used, it will be set to the value 0xff in the preferred embodiment. An Interconnect PLIC Number field (1 octet) contains the number of the Phone Line Interface Card (PLIC) slot (in the interconnect device) that was removed from the centralized interconnect call. If this field is not used, it will be set to the value 0xff in the preferred embodiment. An Interconnect TRIC Number field (1 octet) contains the number of the Trunked Repeater Interface Card (TRIC) slot (in the interconnect device) that was removed from the centralized interconnect call. If this field is not used, it will be set to the value 0xff in the preferred embodiment.

A Decentralized Interconnect Device Number field (1 octet) contains the number of the decentralized interconnect device that was removed from the decentralized interconnect call. If this field is not used, it will be set to the value 0xff in the preferred embodiment. A Decentralized Phone Line Number field (1 octet) contains the number of the phone line interface port that was removed from the decentralized interconnect call. If this field is not used, it will be set to the value 0xff in the preferred embodiment. A Decentralized Interconnect Channel Number field (1 octet) contains the number of the channel at the site that the decentralized phone line is at that was removed from the decentralized interconnect call. If this field is not used, it will be set to the value 0xff in the preferred embodiment.

A CIU Number field (1 octet) contains the number of the CIU removed from the call. A CDL Number field (1 octet) contains the CDL (CIU Data Link) number. A DIU Number field (1 octet) contains the number of the DIU removed from the call. A DBL field (1 octet) contains the Data Broadcast Link (DBL) number. A Removed Sites and Channels field (64 octets) contains a list of the channels on a site-by-site basis that were removed from the call.

An IZAC Number field (1 octet) contains the number of the Inter-Zone Audio Channel (IZAC) that was removed from the call. A Local Zone ID field (1 octet) contains the ID of the local zone that logged this message. A Timestamp field (8 octets) contains the time that the packet was message.

The Manager Packet 413 for the Resource Removed Message comprises a Zone Manager field (34 octets) that contains 34 octets of data that are reserved for use by the zone manager 107 for uses such as described above.

Figure 6:
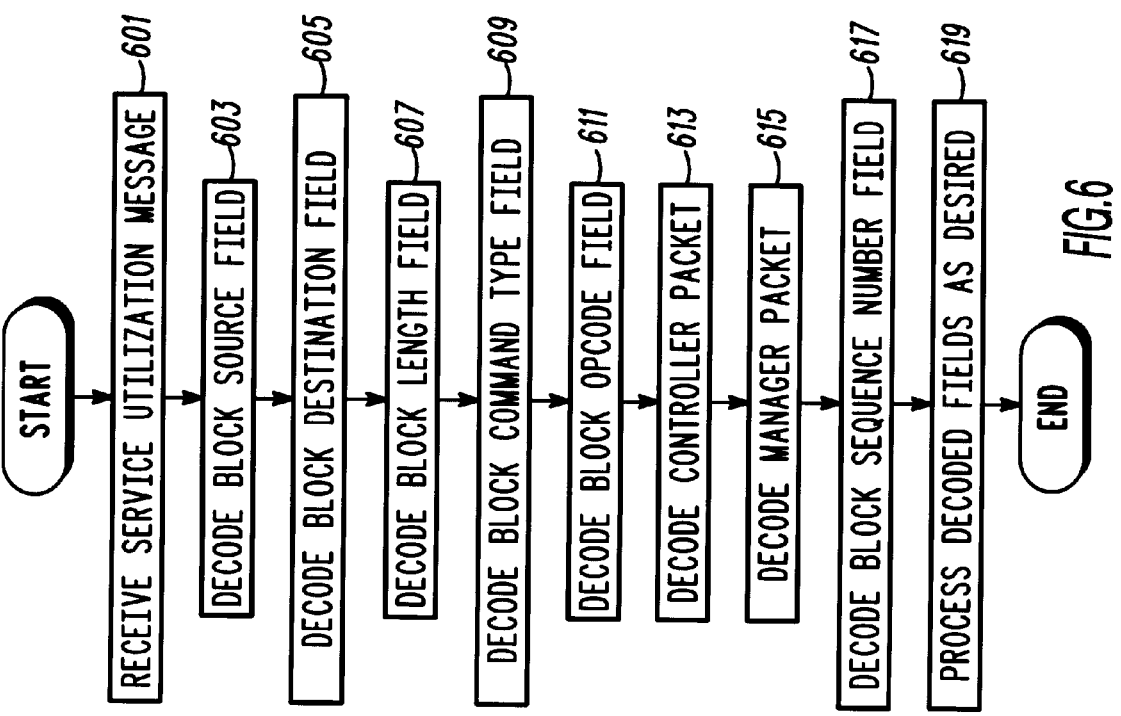
FIG. 6 is a flowchart showing a method of decoding a service utilization message in accordance with the invention.

A flowchart showing a method of decoding a service utilization message is shown in FIG. 6. At step 601, a service utilization message is received by the protocol reader 125. At step 603, the Block Source Field 201 is decoded. At step 605, the Block Destination Field 203 is decoded. At step 607 the Block Length Field 205 is decoded. At step 609, the Block Command Type Field 207 is decoded. At step 611, the Block Opcode field 209 is decoded. At step 613, the Controller Packet 211 is decoded. At step 615, the Manager Packet 213 is decoded. At step 617, the Block Sequence Number field 215 is decoded. The above steps of decoding may include simply stripping the particular field or packet from the received service utilization message. The decoding may further include error correction, error detection, decryption, data extraction, and so forth. The decoding may also include any type of demodulation as may be required to distinguish one field/packet from another. Although it is more efficient to decode the fields/packets in the order as shown in steps 603 through 617, one may decode and/or strip off the fields/packets in sequential order, nonsequential order, or multiple fields/packets at a time, as known by one of skill in the art. At step 619, the decoded fields/packets from step 603 through 617 are processed as desired, including determining which resources were used in a call, what talkgroup were involved in the call, the time and duration of a call, and so forth. Such processing may also include finding relevant information as may be pertinent to call billing, such as beginning and end times for calls, the user's ID, the nature and number of resources utilized, and so forth.

Figure 7:
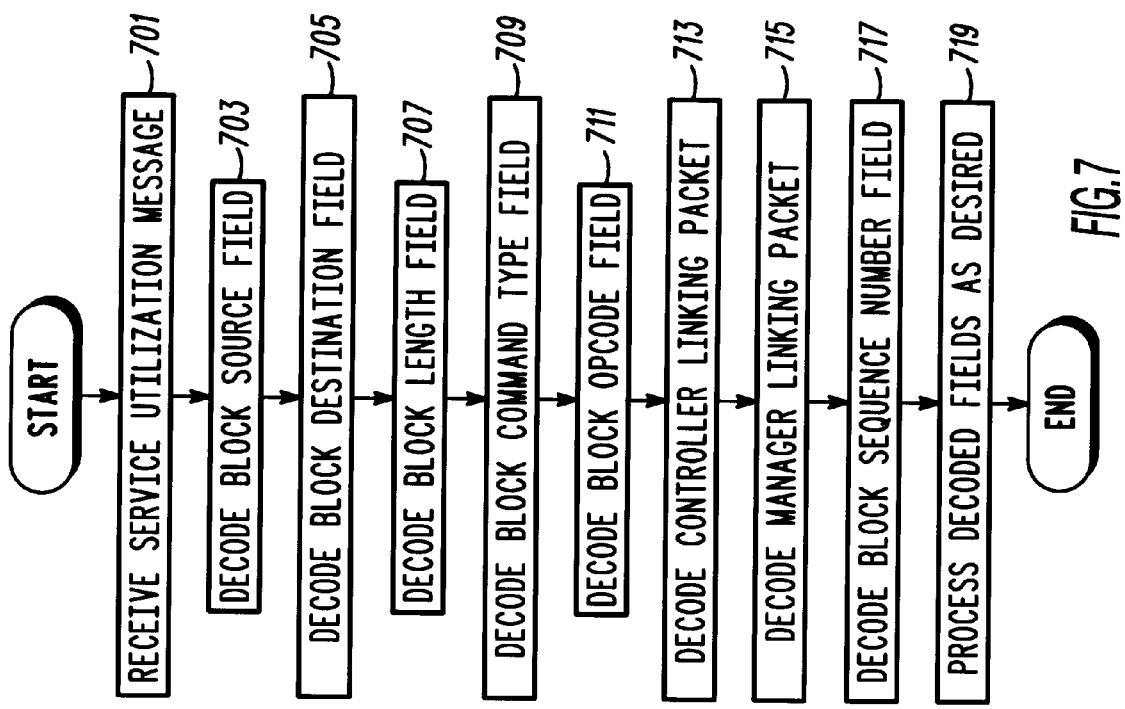
FIG. 7 is a flowchart showing a method of decoding a service utilization linking message in accordance with the invention.

A flowchart showing a method of decoding a service utilization linking message is shown in FIG. 7. At step 701, a service utilization message is received by the protocol reader 125. At step 703, the Block Source Field 401 is decoded. At step 705, the Block Destination Field 403 is decoded. At step 707 the Block Length Field 405 is decoded. At step 709, the Block Command Type Field 407 is decoded. At step 711, the Block Opcode Field 409 is decoded. At step 713, the Controller Linking Packet 411 is decoded. At step 715, the Manager Linking Packet 413 is decoded. At step 717, the Block Sequence Number Field 415 is decoded. The above steps of decoding may include simply stripping the particular field or packet from the received service utilization message. The decoding may further include error correction, error detection, decryption, data extraction, and so forth. The decoding may also include any type of demodulation as may be required to distinguish one field/packet from another. Although it is more efficient to decode the fields/packets in the order as shown in steps 703 through 717, one may decode and/or strip off the fields/packets in sequential order, nonsequential order, or multiple fields/packets at a time, as known by one of skill in the art. At step 719, the decoded fields/packets from step 703 through 717 are processed as desired, including determining which zones were used in a call, what talkgroups/individuals were involved in the call, the time and duration of a call, and so forth. Such processing may include finding relevant information as may be pertinent to call billing, such as beginning and end times for calls, the user's ID, the nature and number of resources utilized, and so forth.

Throughout the above description, the service utilization messages and service utilization linking messages are described as being grouped in terms of headers, service controller (linking) packets, and service manager (linking) packets. These titles are merely logical names for groupings of fields and these names and divisions of what fields are associated with which logical name are not critical to the successful practice of the present invention. Thus, other logical names for groupings of fields and the divisions of what fields are associated with which logical name may be used to successfully practice the present invention without departing from its spirit or essential characteristics.

The present invention provides a system monitoring mechanism that provides, inter alia, call traffic information, system usage traffic information including busy resources, and call alert transaction traffic information. The present invention provides an efficient alternative to monitoring a control channel to obtain overall system service utilization, because a single monitor for the system need only be utilized rather than a separate monitor for each control channel. The present invention provides a lot more information than is available on the control channel, which typically only includes 27 to 96 information bits per packet, in order to track all of the information associated with a call. Call information is provided in a manner that fully integrates all call activity. The protocol provided herein, including the controller (linking) packets and manager (linking) packets, provides an efficient manner of call tracking while providing a flexible way for many different call tracking methods, e.g., call billing, call logging, call statistics, and call reporting, to be handled through one basic message structure.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method of sending a service utilization message in a communication system comprising the steps of:

forming a service utilization message comprising:
  a) a header that comprises:
    (a1) a block source field;
    (a2) a block destination field;
    (a3) a block length field;
    (a4) a block command type field;
  b) a service controller packet that comprises:
    (b1) a block opcode field;
    (b2) a controller packet;
  c) a service manager packet that comprise:
    (c1) a manager packet comprising a security identification (ID) field, the security ID field containing the identity of an organization that has communication and management control over a set of talkgroups;
    (c2) a block sequence number field;

sending the service utilization message via a service port.

2. The method of claim 1, wherein the service utilization message further comprises a timestamp field.

3. The method of claim 1, wherein the service utilization message further comprises a universal call number field.

4. The method of claim 1, wherein the service utilization message further comprises a radio type qualifiers field.

5. The method of claim 1, wherein the service utilization message further comprises a talkgroup identification field.

6. The method of claim 1, wherein the controller packet comprises:

a Primary Identification (ID) field;
a Requester Affiliation Type field;
a Requester Affiliated Group ID field;
a Requester Affiliated Zone ID field;
a Requester Affiliated Site ID field;
a Requester Protocol Type field;
a Requester Device Type field;
a Radio Type Qualifiers field;
a Secondary ID field;
a Target Affiliation Type field;
a Target Affiliated Group ID field;
a Target Affiliated Zone ID field;
a Target Affiliated Site ID field;
a Target Protocol Type field;
a Timestamp field;
a Call Number field;
a Source Site ID of Call field;
a Call Type field;
an Interconnect Device Number field;
an Interconnect Phone Line Interface Card Number field;
an Interconnect Trunked Repeater Interface Card Number field;
a Decentralized Interconnect Device Number field;

a Decentralized Phone Line Number field;
a Decentralized Interconnect Channel Number field;
a Console Interface Unit (CIU) Number field;
a CIU Data Link Number field;
a Digital Interface Unit Number field;
a Data Broadcast Link field;
a Secure Key Number field;
a Secure Index Number field;
an Active/Busy Status field;
a Busy Reason field;
a State Transition field;
a Requested Site Information field;
a Busy/No Resources Site Information field;
a Not Capable Site Information field;
an Active Site/Channel Information field;
a Controlling Zone Controlled Flag field;
a Controlling Zone ID field;
a Universal Call Number field;
a Call Sequence Number field;
an Event Sequence Number field;
an Inter-Zone Audio Channel Number field;
an Interconnect Phone State field;
a Busy Resource Bitmap field;
a Busy Zone Contributing flag field;
a Local Zone ID field;
a Zone Manager field;
and wherein the security ID field of the manager packet is a primary security ID field and the manager packet further comprises:
a Primary Alias field;
a Secondary Alias field;
a Requester Affiliated Talkgroup ID Alias field;
a Target Affiliated Talkgroup ID Alias field;
a Secondary Security ID field;
a Requester Affiliated Security ID field;
a Target Affiliated Security ID field.

7. The method of claim 1, wherein the controller packet comprises:
a Call Number field;
an End of Call Reason field;
a Local Zone Identification (ID) field;
a Timestamp field;
a Controlling Zone Controlled Flag field;
a Controlling Zone ID field;
a Universal Call Number field;
a Call Sequence Number field;
an Event Sequence Number field.

8. The method of claim 1, wherein the controller packet comprises:
a Primary Identification (ID) field;
a Requester Affiliation Type field;
a Requester Affiliated Group ID field;
a Target Affiliated Zone ID field;
a Requester Affiliated Site ID field;
a Requester Protocol Type field;
a Requester Device Type field;
a Radio Type Qualifiers field;
a Secondary ID field;
a Target Affiliation Type field;
a Target Affiliated Group ID field;
a Target Affiliated Zone ID field;
a Target Affiliated Site ID field;
a Target Protocol Type field;
a Deaffiliation Reason field;
a Timestamp field;
a Subscriber Reject Reason field;
a Status/Message Number field;
a Call Type field;
a Sites in Status field;
a Requesting Zone ID field;
a Controlling Zone ID field;
a Universal Call Number field;
a Second Zone ID field;
a Local Zone ID field;
a Console ID field;
and wherein the security ID field of the manager packet is a primary security ID field and the manager packet further comprises:
a Primary Alias field;
a Secondary Alias field;
a Requester Affiliated Talkgroup Identification (ID) Alias field;
a Target Affiliated Talkgroup ID Alias field;
a Secondary Security ID field;
a Requester Affiliated Security ID field;
a Target Affiliated Security ID field.

9. The method of claim 1, wherein the controller packet comprises:
a Subscriber Identification (ID) field;
a Duration field;
a Call Type field;
a Phone Number field;
a Call Feature field;
an Interconnect Device ID field;
a Port Group ID field;
a Timestamp field;
and wherein the manager packet further comprises:
a Subscriber Alias field.

10. The method of claim 1, wherein the controller packet comprises:
a Site Number field;
a Channel Number field;
a System Activity Reason (Single-Zone System) field;
a Local Zone Identification field;
a Timestamp field;
an Interzone Bitmap field;
a Zone Controller Status Bitmap field;
a System Activity Reason (Multiple-Zone System) field.

11. The method of claim 1, wherein the controller packet comprises:
a Primary Identification (ID) field;
a Secondary ID field;
a Status/Message Acknowledgment Number field;
a Command Number field; and
wherein the security group ID field of the manager packet is a primary security ID field and the manager packet further comprises:

a Primary Alias field;

a Secondary Alias field;

a Secondary Security ID field;

a Timestamp field.

12. A method of sending a service utilization linking message in a communication system comprising the steps of:

forming a service utilization linking message comprising:
        a) a header that comprises:
            (a1) a block source field;
            (a2) a block destination field;
            (a3) a block length field;
            (a4) a block command type field;
        b) a service controller linking packet that comprises:
            (b1) a block opcode field;
            (b2) a controller linking packet;
        c) a service manager linking packet that comprises:
            (c1) a manager linking packet;
            (c2) a block sequence number field;

sending the service utilization linking message via a service port; and wherein the service utilization linking message further comprises a security group identification field.

13. The method of claim 12, wherein the service utilization linking message further comprises a timestamp field.

14. The method of claim 12, wherein the service utilization linking message further comprises a universal call number field.

15. The method of claim 12, wherein the service utilization linking message further comprises a radio type qualifiers field.

16. The method of claim 12, wherein the service utilization message further comprises a talkgroup identification field.

17. The method of claim 12, wherein the controller linking packet comprises:

a Primary Identification (ID) field;

a Secondary ID field;

an Inter-Zone Audio Channel Number List field;

a Sourcing Zone ID field;

a Controlling Zone ID field;

a Universal Call Number field;

a Call Sequence Number field;

an Overall Call Status field;

an End of Call Reason field;

a Busy Reason field;

a Call Type field;

a Radio Type Qualifiers field;

an Eligible Zone Bitmap field;

a Participating Zone Bitmap field;

an Active or Busy Contributing Zone Bitmap field;

a Timestamp field;

a Console ID field;

and wherein the manager linking packet comprises:

a Primary Alias field;

a Secondary Alias field;

a Primary Security ID field;

a Secondary Security ID field.

18. The method of claim 12, wherein the controller linking packet comprises:

a Preempted Failed Controlling Zone Identification (ID) field;

a Preempting Controlling Zone ID field;

a Preempted Failed Universal Call Number field;

a Preempting Universal Call Number field;

a Preempted Failed Radio Type Qualifier (RTQ) field;

a Preempting RTQ field;

a Preempted Failed Call Type field;

a Preempted Call Type field;

a Resource Removed Bitmap field;

an Interconnect Device Number field;

an Interconnect Phone Line Interface Card Number field;

an Interconnect Trunked Repeater Interface Card Number field;

a Decentralized Interconnect Device Number field;

a Decentralized Phone Line Number field;

a Decentralized Interconnect Channel Number field;

a Console Interface Unit (CIU) Number field;

a CIU Data Link Number field;

a Digital Interface Unit Number field;

a Data Broadcast Link field;

a Removed Sites and Channels field;

an Inter-Zone Audio Channel Number field;

a Local Zone ID field;

a Timestamp field.

19. A method of decoding a service utilization message comprising the steps of:

receiving a service utilization message;

decoding the service utilization message comprising:
        a) a header that comprises:
            (a1) a block source field;
            (a2) a block destination field;
            (a3) a block length field;
            (a4) a block command type field;
        b) a service controller packet that comprises:
            (b1) a block opcode field;
            (b2) a controller packet;
        c) a service manager packet that comprise:
            (c1) a manager packet comprising a security identification (ID) field, the security ID field containing the identity of an organization that has communication and management control over a set of talkgroups;
            (c2) a block sequence number field;

processing at least a part of the decoded service utilization message.

20. The method of claim 19, wherein the service utilization message further comprises a timestamp field and a universal call number field.

21. The method of claim 19, wherein the service utilization linking message further comprises a radio type qualifiers field.

22. The method of claim 19, wherein the service utilization message further comprises a talkgroup identification field.

23. The method of claim 19, wherein the controller packet comprises:

a Primary ID (identification) field;

a Requester Affiliation Type field;

a Requester Affiliated Group ID field;

a Requester Affiliated Zone ID field;

a Requester Affiliated Site ID field;

a Requester Protocol Type field;

a Requester Device Type field;
a Radio Type Qualifiers field;
a Secondary ID field;
a Target Affiliation Type field;
a Target Affiliated Group ID field;
a Target Affiliated Zone ID field;
a Target Affiliated Site ID field;
a Target Protocol Type field;
a Timestamp field;
a Call Number field.

24. The method of claim 19, wherein the security ID field of the manager packet is a primary security ID field and the manager packet further comprises:
a Primary Alias field;
a Secondary Alias field;
a Requester Affiliated Talkgroup ID Alias field;
a Target Affiliated Talkgroup ID Alias field;
a Secondary Security ID field;
a Requester Affiliated Security ID field;
a Target Affiliated Security ID field.

25. A method of decoding a service utilization linking message comprising the steps of:
receiving a service utilization linking message;
decoding the service utilization message comprising:
  a) a header that comprises:
    (a1) a block source field;
    (a2) a block destination field;
    (a3) a block length field;
    (a4) a block command type field;
  b) a service controller linking packet that comprises:
    (b1) a block opcode field;
    (b2) a controller linking packet;
  c) a service manager linking packet that comprises:
    (c1) a manager linking packet;
    (c2) a block sequence number field;
processing at least a part of the decoded service utilization linking message;
wherein the service utilization linking message further comprises a security group identification field.

26. The method of claim 25, wherein the service utilization linking message further comprises a timestamp field and a universal call number field.

27. The method of claim 25, wherein the service utilization linking message further comprises a radio type qualifiers field.

28. The method of claim 25, wherein the service utilization message further comprises a talkgroup identification field.

29. The method of claim 25, wherein the controller linking packet comprises:
a Primary ID (identification) field;
a Requester Affiliation Type field;
a Requester Affiliated Group ID field;
a Requester Affiliated Zone ID field;
a Requester Affiliated Site ID field;
a Requester Protocol Type field;
a Requester Device Type field;
a Radio Type Qualifiers field;
a Secondary ID field;
a Target Affiliation Type field;
a Target Affiliated Group ID field;
a Target Affiliated Zone ID field;
a Target Affiliated Site ID field;
a Target Protocol Type field;
a Timestamp field;
a Call Number field.

30. The method of claim 25, wherein the manager linking packet comprises:
a Primary Alias field;
a Secondary Alias field;
a Requester Affiliated Talkgroup ID Alias field;
a Target Affiliated Talkgroup ID Alias field;
a Primary Security ID field;
a Secondary Security ID field;
a Requester Affiliated Security ID field;
a Target Affiliated Security ID field.

* * * * *